(12) United States Patent
Kimoto et al.

(10) Patent No.: US 8,517,541 B2
(45) Date of Patent: Aug. 27, 2013

(54) PROJECTION IMAGE DISPLAY DEVICE WITH SWITCHING LUMINANCE CONTROLLER

(75) Inventors: Takayuki Kimoto, Osaka (JP); Takaaki Gyoten, Hyogo (JP); Hiroshi Kitano, Hyogo (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 13/049,953

(22) Filed: Mar. 17, 2011

(65) Prior Publication Data

US 2011/0242496 A1 Oct. 6, 2011

(30) Foreign Application Priority Data

Mar. 30, 2010 (JP) ................................. 2010-078330
Mar. 30, 2010 (JP) ................................. 2010-078331

(51) Int. Cl.
*G03B 21/20* (2006.01)
(52) U.S. Cl.
USPC ........................................................... 353/85
(58) Field of Classification Search
USPC ................. 353/85, 52, 53, 54, 55, 56, 57, 58, 353/59, 60, 61; 348/748
See application file for complete search history.

(56) References Cited

U.S. PATENT DOCUMENTS

| 7,258,450 B2 * | 8/2007 | Koyama et al. ................. 353/94 |
| 8,231,227 B2 * | 7/2012 | Kurosaki ......................... 353/31 |
| 2006/0203204 A1 * | 9/2006 | Yu .................................... 353/52 |
| 2007/0052932 A1 * | 3/2007 | Blonde et al. ................... 353/82 |
| 2010/0079730 A1 * | 4/2010 | Shibasaki ........................ 353/31 |
| 2010/0238412 A1 * | 9/2010 | Kurosaki ......................... 353/31 |

FOREIGN PATENT DOCUMENTS

| JP | 11-129525 A | 5/1999 |
| JP | 2004-341105 A | 12/2004 |
| JP | 2004-356579 A | 12/2004 |
| JP | 2009-512896 A | 3/2009 |
| JP | 2009-122385 A | 6/2009 |
| JP | 2009-277516 A | 11/2009 |
| WO | WO 2007/050399 A2 | 5/2007 |

OTHER PUBLICATIONS

XJ-A145/XJ-A140 Production Information, Feb. 26, 2010.*
Casio News Release, Feb. 26, 2010.*

* cited by examiner

*Primary Examiner* — Francis M Legasse, Jr.
*Assistant Examiner* — Bao-Luan Le
(74) *Attorney, Agent, or Firm* — RatnerPrestia

(57) ABSTRACT

A projection image display device has a plurality of light sources, a phosphor layer that emits light through excitation by at least any one of the light sources, an optical section, a temperature detector, a light-source intensity controller, an amplitude controller, a luminance controller. The optical section determines an optical path of light emitted from the light sources and the phosphor layer. The temperature detector directly or indirectly detects temperature of the phosphor layer or of the periphery of the phosphor layer. The light-source intensity controller controls intensity of an excitation light source that excites the phosphor layer. The amplitude controller controls the amplitude of a projection image signal. The luminance controller controls luminance of projection images by switching the light-source intensity controller and the amplitude controller according to a detected temperature.

20 Claims, 13 Drawing Sheets

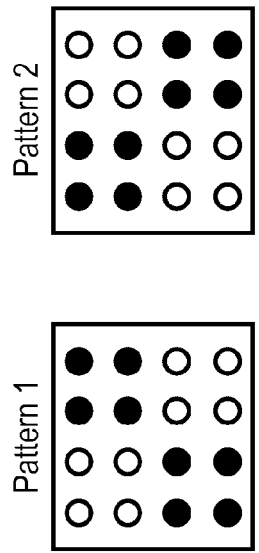
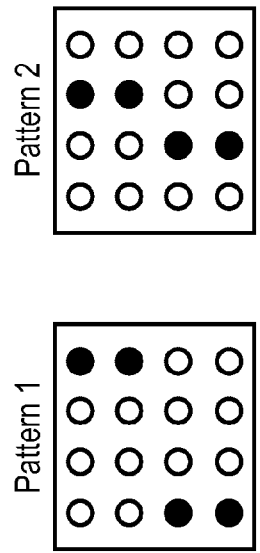
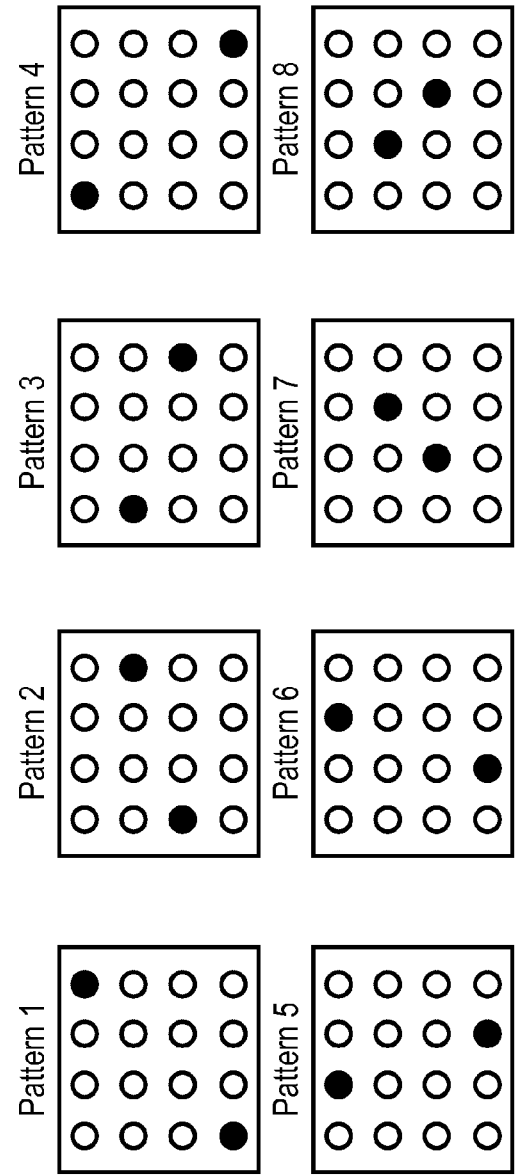
FIG. 13A
FIG. 13B
FIG. 13C

PROJECTION IMAGE DISPLAY DEVICE WITH SWITCHING LUMINANCE CONTROLLER

FIELD OF THE INVENTION

The present invention relates to a projection image display device having a light-emitting element as a light source.

BACKGROUND ART

As a personal computer, video equipment, and a digital camera are becoming popular, a projection image display device (hereinafter referred to as a projector) has been often used for displaying moving or still image.

Generally, in a projector, light fed from a light source is collected at a predetermined place and modulated by light modulation devices, such as a DMD (digital mirror device) and a liquid crystal element, by which color images are displayed on the screen. To display images with high luminance on a large screen, the projector requires a high-intensity light source. From the reason, a high-intensity discharge lamp has been mainly employed for the light source. In recent years, however, to meet the demands for lower power consumption, a longer lasting light source, and a compact body of the device, some suggestions have been made. In such suggestions, light-emitting elements, such as a light-emitting diode and a laser diode, are used and a plurality of light sources is employed for increase in intensity (for example, see patent literature 1). In a device where a light-emitting element is used for obtaining a high-intensity light source, high durability of the light source is essential. In particular, in a case where light from a laser light source excites phosphors for light emission, deterioration of phosphor layers exposed to excitation light often invites poor durability of a projector.

To address the problems above, prior art technique has introduced some suggestions on climate control of a laser light source and decrease in energy of excitation light onto phosphors (for example, see patent literatures 2 through 4).

According to the methods, proper control of temperature, humidity, and energy of excitation light protects a light source and phosphors from aging deterioration.

However, when the projector is used in various situations, it is difficult to maintain the temperatures of the light source and the phosphors at an optimum level according to ambient temperature. A change in temperatures is unavoidable. In the conventional technique, there is no examination on suppressing deterioration of a light source and phosphors according to temperature change of them. The phosphors have a large influence on durability of the projector, and the light-emitting efficiency of them depends on temperatures. When the phosphors have change in temperature while being exposed to excitation light, relative output intensity of the phosphors changes, as shown in FIG. 14. The conventional methods have no measures against changes in light-emitting output according to changes in temperatures of the phosphor layers exposed to excitation light. Therefore, the light-emitting output of the phosphors cannot be maintained at a proper output level as the light source of the projector. This invites deterioration of phosphors, resulting in degradation of image quality (i.e. decrease in brightness of the screen).

CITATION LIST

Patent Literature

Patent Literature 1: Japanese Unexamined Patent Application Publication No. 2004-341105

Patent Literature 2: Japanese Unexamined Patent Application Publication No. 2004-356579

Patent Literature 3: Japanese Unexamined Patent Application Publication No. 2009-122385

Patent Literature 4: Japanese Unexamined Patent Application Publication No. 2009-277516

SUMMARY OF THE INVENTION

The projection image display device of the present invention has a plurality of light sources, a phosphor layer that emits light through excitation by at least any one of the light sources, an optical section, a temperature detector, a light-source intensity controller, an amplitude controller, a luminance controller. The optical section determines an optical path of light emitted from the light sources and the phosphor layer. The temperature detector directly or indirectly detects the temperature of the phosphor layer or of the periphery of the phosphor layer. The light-source intensity controller controls intensity of an excitation light source that excites the phosphor layer. The amplitude controller controls the amplitude of a projection image signal. The luminance controller controls luminance of projection images by switching the light-source intensity controller and the amplitude controller according to a detected temperature.

Such structured projection image display device properly controls luminance of projection images according to change in temperatures of the light source and the phosphor layer in various operating environments. The device of the present invention maintains the luminance of projection images at an optimum level according to change in light-emitting output caused by temperature characteristics of phosphors. At the same time, the device suppresses deterioration of phosphors and power consumption of the excitation light source.

BRIEF DESCRIPTION OF THE DRAWINGS

FIG. 13A shows lighting patterns of the excitation light sources (with eight turned-off light sources) of the projection image display device in accordance with the second exemplary embodiment of the present invention.

FIG. 13B shows lighting patterns of the excitation light sources (with four turned-off light sources) of the projection image display device in accordance with the second exemplary embodiment of the present invention.

FIG. 13C shows lighting patterns of the excitation light sources (with two turned-off light sources) of the projection image display device in accordance with the second exemplary embodiment of the present invention.

DETAILED DESCRIPTION OF THE INVENTION

The preferred embodiments of the present invention are described hereinafter with reference to the accompanying drawings.

First Exemplary Embodiment

Figure 1:
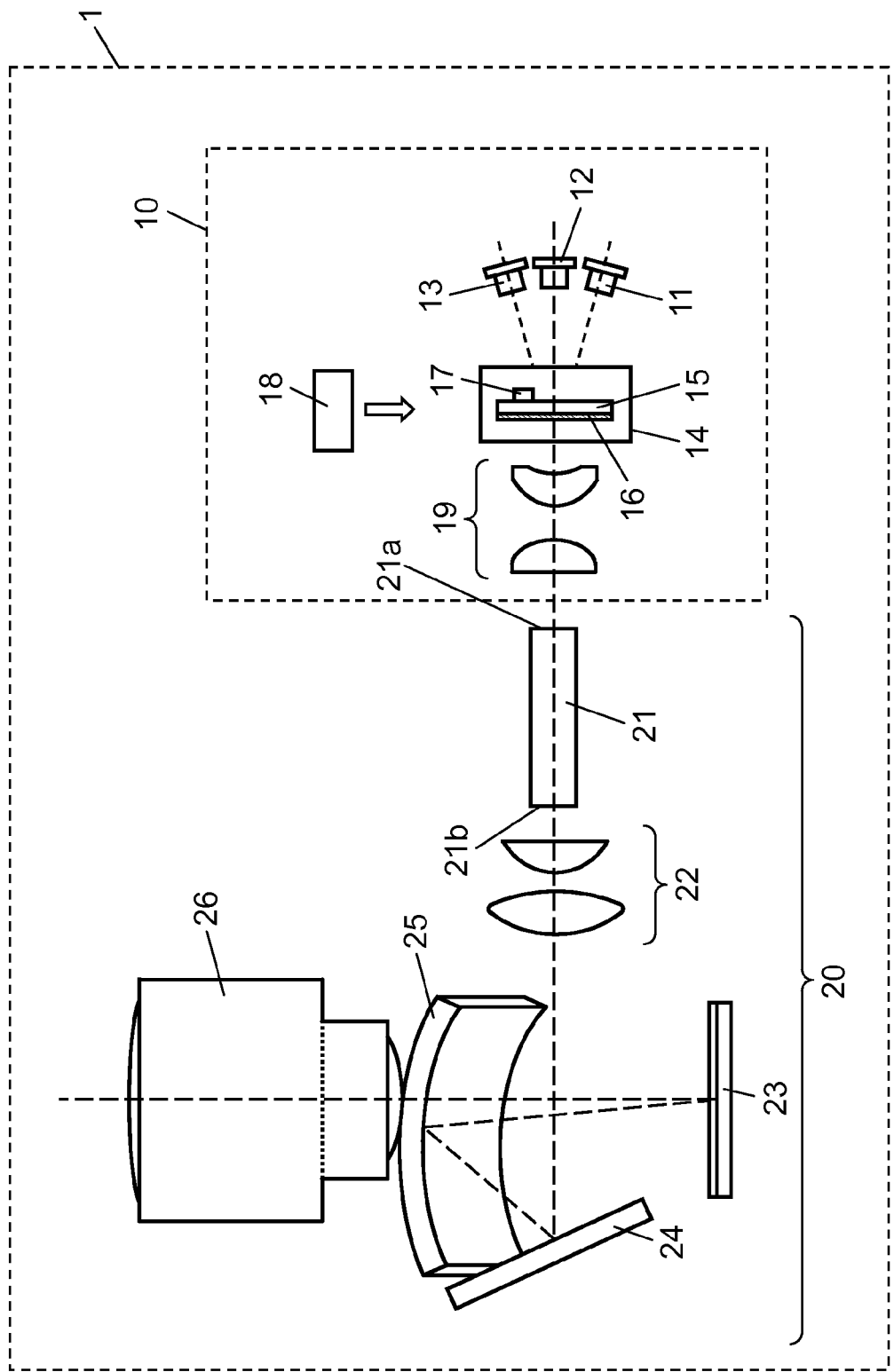
FIG. 1 shows main components of the optical device of the projection image display device in accordance with a first exemplary embodiment of the present invention.

FIG. 1 shows main components of optical device 1 mounted on the projection image display device (hereinafter simply referred to as the device) in accordance with the first exemplary embodiment of the present invention. Optical device 1 has illuminating device 10, optical transmitter 20, and projection lens 26. Optical transmitter 20 is an optical section that determines the optical path of the light fed from illuminating device 10. Projection lens 26 is disposed on the optical path of optical transmitter 20. The device projects color images via projection lens 26 onto a screen (not shown).

Hereinafter, the main structure of optical device 1 will be described with reference to FIG. 1. As shown in FIG. 1, illuminating device 10 has blue laser sources 11, 12, 13, phosphor heat dissipation unit 14 (hereinafter, heat dissipation unit 14), blast fan 18, and collecting lens 19. Heat dissipation unit 14 further contains substrate glass 15 held by a holder (not shown), phosphor layer 16, and temperature sensor 17. Phosphor layer 16 is formed on substrate glass 15. Temperature sensor 17 is attached on the rear surface (that is opposite to the phosphor-applied surface) of substrate glass 15. Blast fan 18 is disposed adjacent to heat dissipation unit 14 and cools phosphor layer 16 and other components of illuminating device 10.

The device employs the followings, for example, for light sources: a light-emitting diode (LED) for red color, blue laser (solid light-emitting element) for blue color, and a phosphor as an excitation light-emitting element (hereinafter, green phosphor) for green color. To obtain a proper level of luminance, some red LEDs (generally, one to four pieces) are used. The green phosphor is excited by the blue laser light source. The device employs a plurality of (specifically, 16 pieces of) excitation blue laser sources to enhance light-emitting output of the green phosphor and maintain a proper level of luminance of green. For the sake of easy understanding, FIG. 1 shows three pieces of the blue laser sources. Detailed structure and usage of the blue laser sources will be described later (see FIGS. 10 through 13). Green phosphor layer 16 is formed on substrate glass 15 of heat dissipation unit 14. Excited by blue laser sources 11, 12, and 13, green phosphor layer 16 emits green visible light. The light travels heat dissipation unit 14 through collecting lens 19 and enters in rod integrator 21. Substrate glass 15 is made of heat-conducting glass (for example, sapphire glass). On substrate glass 15, phosphor layer 16 is formed on the side opposite to that facing light sources 11, 12, and 13. Phosphor layer 16 is formed by coating or screen printing. Heat dissipation unit 14 has openings (not shown) in the front surface that faces light sources 11, 12, 13 and at the center of the rear surface. Excitation light from light sources 11,12, and 13 travels through the opening in the front surface and excites phosphor layer 16. The light emitted from phosphor layer 16 travels through the opening in the rear surface, collecting lens 19 and into optical transmitter 20.

As for light emission of red and blue, the device has a red light source (of LED) and a blue light source (of laser) and respective optical path, which are disposed separately from blue laser sources 11, 12, 13 for exciting green phosphor. Each beam fed from the red light source and the blue light source travels through each optical path and reaches incidence plane 21a of rod integrator 21. The description of the present invention focuses on the phosphor and the light source that excites the phosphor, and therefore, the light sources for red and blue light emission are omitted from the description and drawings.

Light transmitter 20 has rod integrator 21, relay lens 22, return mirror 24, curved mirror 25, digital mirror device (DMD) 23 as an image display element. The light from illuminating device 10 reaches incidence plane 21a of rod integrator 21 of light transmitter 20. Passing through rod integrator 21, the light beams of red, blue, and green get out of output plane 21b and travel, via relay lens 22, return mirror 24, curved mirror 25, to DMD 23.

DMD 23 has minute mirrors disposed in a two-dimensional arrangement. Each mirror can adjust the tilt according to an input signal. To be specific, a mirror positioned at a pixel for displaying white tilts in a direction in which the incident angle decreases, so that a light beam entered in the mirror passes through projection lens 26 and reaches the screen (not shown). On the other hand, a mirror positioned at a pixel for displaying black tilts in a direction in which the incident angle increases, so that a light beam entered in the mirror is guided outside projection lens 26, resulting in black display on the screen. At that time, the shape of output plane 21b of rod integrator 21 is transferred on DMD 23, by which DMD 23 uniformly collects light beams with efficiency. DMD 23 may be driven by the driving circuit (that will be described later). For example, the mirrors are driven at a high speed according to image signals of red, green, and blue. The light emission of three colors fed from the light source and the phosphor layer is formed, through projection lens 26, into color image on the screen.

Next, change in temperature of phosphor layer 16 of the present invention is described.

Figure 14:
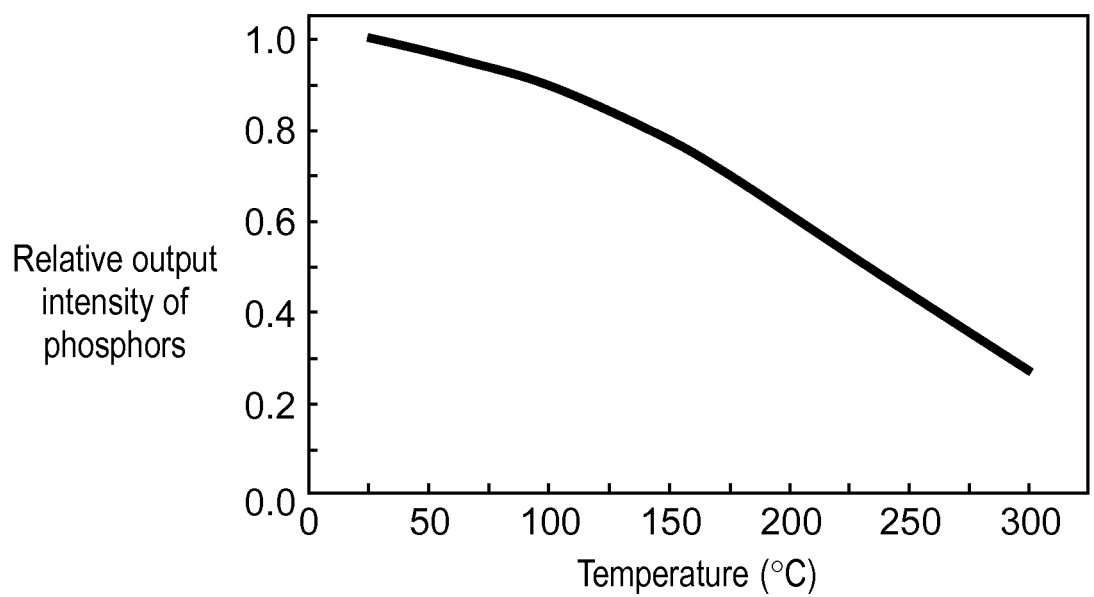
FIG. 14 shows relationship between the relative output intensity and temperatures of the phosphor.

When absorbing excitation light from light sources 11, 12, and 13, phosphor layer 16 and substrate glass 15 of heat dissipation unit 14 generate heat energy. At that time, non-radiative energy with no emission of fluorescence and an amount of energy corresponding to difference between the wavelength of excitation light with emission of fluorescence and the wavelength of fluorescence are released as heat. The heat increases the temperature of substrate glass 15 and phosphor layer 16. To suppress the temperature rise of the components in heat dissipation unit 14, blast fan 18 is disposed in illuminating device 10. However, temporal change in interior temperature of illuminating device 10 and a usage environment of the device affect the temperature of phosphor layer 16. Besides, wavelength conversion efficiency of phosphors has temperature dependence, as shown in FIG. 14. As the temperature increases, relative output intensity of phosphors to excitation light decreases, that is, the amount of light emission from phosphor layer 16 decreases. As a result, the screen loses brightness. Conversely, as the temperature decreases, the relative output intensity of phosphors increases, which increases the amount of light emission. This can deteriorate the phosphors.

To suppress the deterioration of phosphors, with the luminance of projection image maintained at an optimum level, the present invention provides a projection image display device capable of coping with change in relative output intensity of phosphors according to change in temperature of the phosphors. Hereinafter, the structure and workings of components relating to luminance control of projection image will be described with reference to FIG. 2 and FIG. 3.

Figure 2:
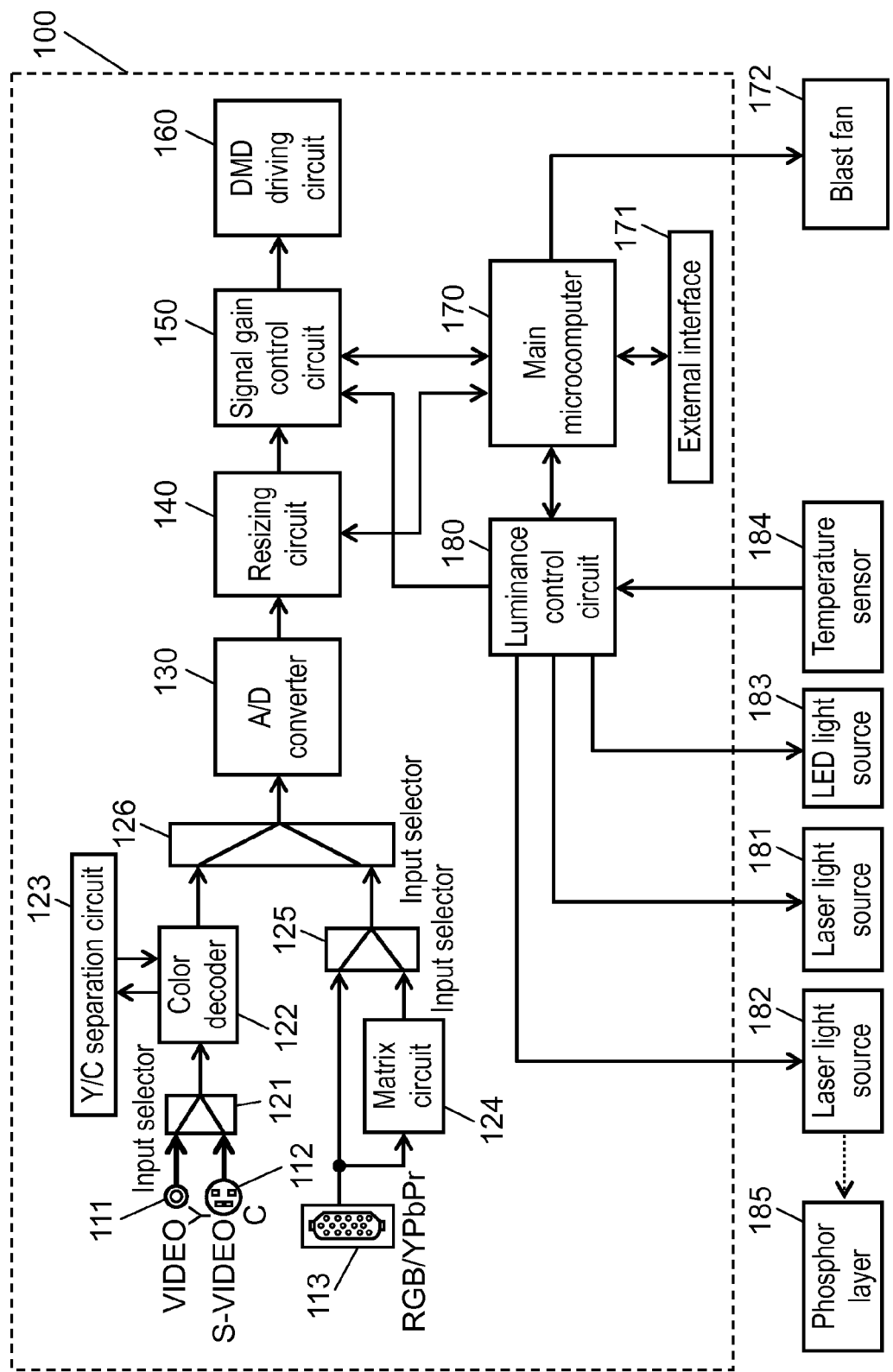
FIG. 2 is a block diagram showing the circuit structure of the projection image display device in accordance with the first exemplary embodiment of the present invention.

First, the circuit structure of the device is described with reference to FIG. 2. FIG. 2 is a block diagram showing the main components of circuit section 100 of the device.

In FIG. 2, VIDEO terminal 111 is the input terminal for an NTSC composite video signal, and S-VIDEO terminal 112 is the input terminal for an S-video signal. RGB/YPbPr terminal 113 is the input terminal for an RGB signal or a YPbPr signal.

Input selector 121 selects either the composite video signal fed from VIDEO terminal 111 or the S-video signal fed from S-VIDEO terminal 112.

Color decoder 122 provides a signal having undergone Y/C separation and a received Y/C signal with color decoding so as to form a YPbPr signal.

Y/C separation circuit 123 receives a composite video signal fed through color decoder 122 and separates it into a Y signal and a C signal.

Matrix circuit 124 carries out matrix processing in converting the YPbPr signal fed from RGB/YPbPr terminal 113 into an RGB signal.

Input selector 125 selects either an RGB signal fed from RGB/YPbPr terminal 113 or an RGB signal generated by matrix circuit 124. Input selector 126 selects either an analog image signal from the YPbPr signal generated by color decoder 122 or the RGB signal fed from input selector 125. Selected analog image signal is fed to A/D converter 130, and a synchronizing signal is fed to DMD driving circuit 160.

A/D converter 130 provides the analog signal selected by input selector 126 with A/D conversion so as to obtain an 8-bit digital image signal.

Resizing circuit 140 works on superimposition of on-screen image. Receiving a digital image signal having undergone A/D conversion by A/D converter 130, resizing circuit 140 resizes the signal so as to be suitable for the number of pixels of DMD 23 (FIG. 1).

Receiving RGB data of the projection image fed from resizing circuit 140, signal gain control circuit 150 amplifies the data according to information from luminance control circuit 180 (that will be described later) and outputs the data to DMD driving circuit 160.

Main microcomputer 170 exercises control over image display and illuminating device 10, for example, control over electric power supply (not shown), blast fan 172, temperature, and input switching. Besides, according to data fed from external interface 171, main microcomputer 170 exercises freeze-control over resizing circuit 140. Main microcomputer 170 is connected to luminance control circuit 180. Luminance control circuit 180 is connected to laser light sources 181, 182, LED light source 183, temperature sensor 184, and signal gain control circuit 150.

Figure 3:
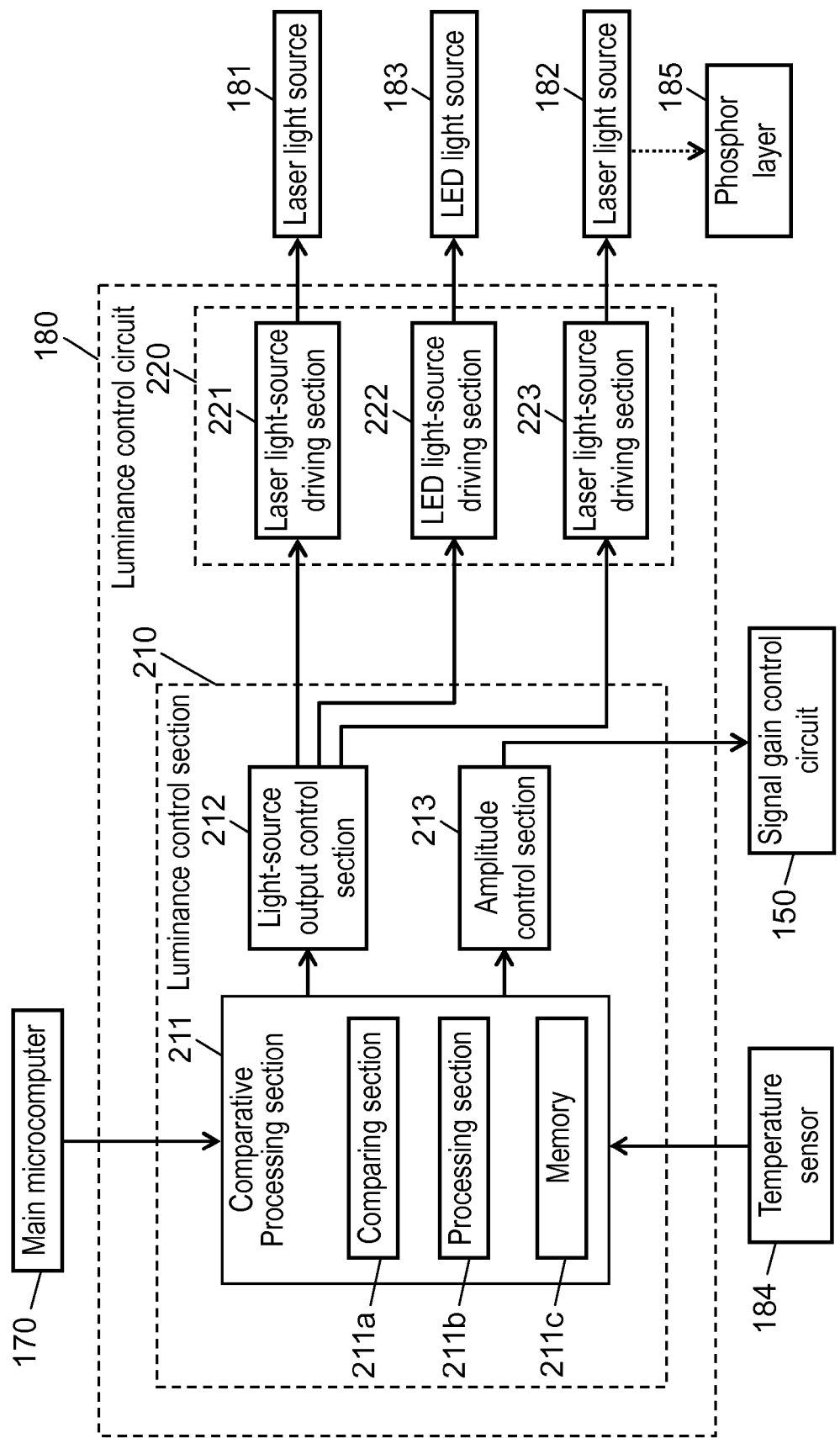
FIG. 3 is a block diagram showing the luminance control circuit of the projection image display device in accordance with the first exemplary embodiment of the present invention.

Next, the detailed structure and workings of luminance control circuit 180 is described with reference to FIG. 3. FIG. 3 is a block diagram showing the circuit structure of luminance control circuit 180.

As shown in FIG. 3, luminance control circuit 180 has luminance control section 210 and light source driving section 220.

Luminance control circuit 180 effects output control of illuminating light for image display (hereinafter, illuminating light). The illuminating light contains light emitted from phosphor layer 185 (corresponding to phosphor layer 16 of FIG. 1) excited by light from laser light source 182 (corresponding to light sources 11, 12, and 13 of FIG. 1), LED light source 183, and laser light source 181. Besides, luminance control section 180 effects control of signal gain control circuit 150 so as to properly determine the amplitude of a projection image signal. Luminance control section 210 has comparative processing section 211, light-source output control section 212 (as a light-source intensity controller), and amplitude control section 213. Comparative processing section 211 is connected to main microcomputer 170 and temperature sensor 184 (corresponding to temperature sensor 17 of FIG. 1) that detects temperature of phosphor layer 16 or of the periphery.

Comparative processing section 211 has comparing section 211a, processing section 211b, and memory 211c. Comparing section 211a makes a comparison between detected temperature data received from temperature sensor 184 and reference temperature stored in memory 211c and selects a control item of luminance of projection image. At the same time, according to data on image display received from main microcomputer 170, comparing section 211a makes a comparison relating to the timing of image display and luminance control and provides necessary instructions to processing section 211b. Receiving the control item selected by comparing section 211a, processing section 211b carries out calculation and signal processing by using a predetermined method and procedures and sends necessary instructions to light-source output control section 212 and amplitude control section 213.

Memory 211c stores reference temperature as an index used when phosphor layer 16 has change in temperature, and necessary data relating luminance control of projection image, and programs for driving comparing section 211a and processing section 211b.

Receiving data on illuminating-light control from comparative processing section 211, light-source output control section 212 generates a signal necessary for output control of laser light sources 181, 182 and LED light source 183 and sends the data to laser light-source driving sections 221, 223, and LED light-source driving section 222.

Laser light-source driving sections 221 and 223 effect output-control of laser light sources 181 and 182 according to the data received from light-source output control section 212. Laser light source 182 excites phosphor layer 185.

Similarly, LED light-source driving section 222 effects output-control of LED light source 183 according to the data received from light-source output control section 212.

According to data on amplitude control received from comparative processing section 211, amplitude control section 213 generates an amplitude control signal and outputs it to signal gain control circuit 150 (shown in FIG. 2). Signal gain control circuit 150 provides a projection image signal with white-level expansion.

Figure 4:
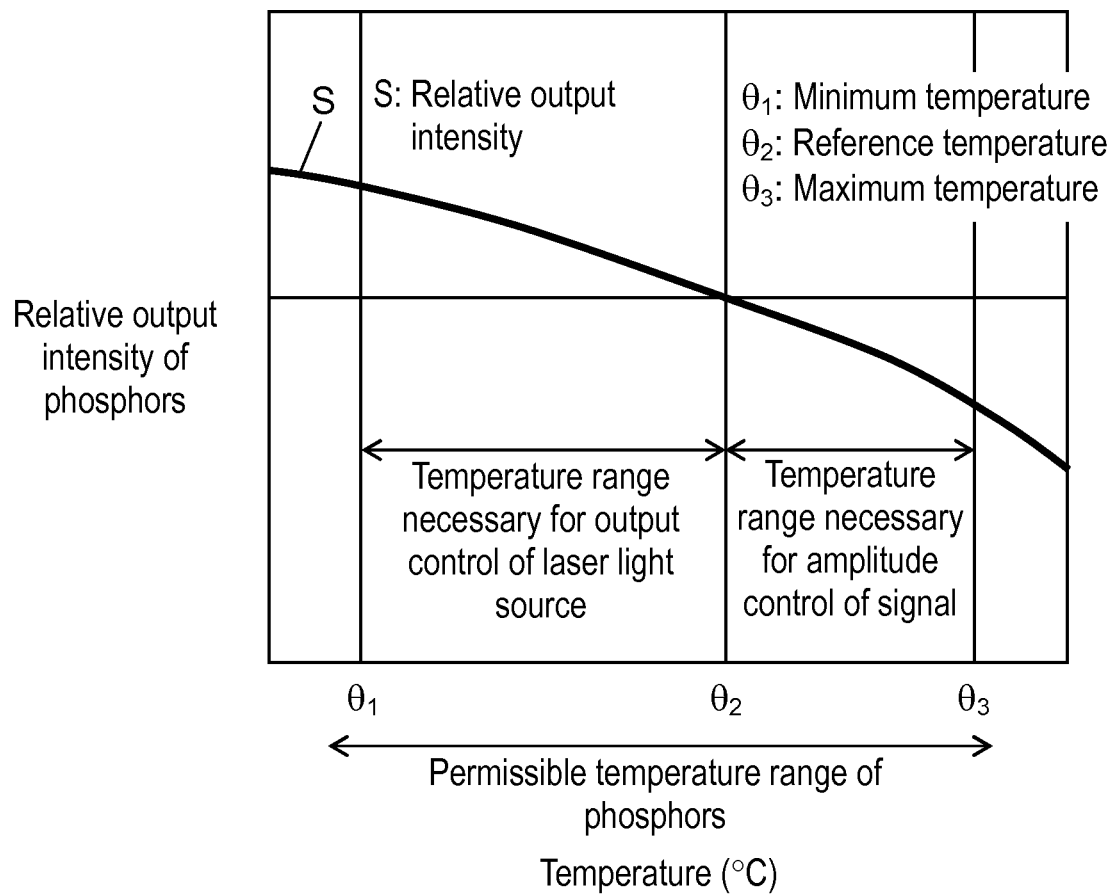
FIG. 4 illustrates how to control the luminance of projection images of the projection image display device in accordance with the first exemplary embodiment of the present invention.

Next, luminance control in luminance control section 210 of luminance control circuit 180 will be described with reference to FIG. 3 and FIG. 4. FIG. 4 illustrates how to control the luminance of projection images of the device. As shown in FIG. 4, a reference temperature and a standard luminance of projection image suitable for the temperature are determined in advance within the range of permissible temperatures of phosphor layer 185. The device maintains each standard luminance of projection image at each temperature in the permissive temperature range, thereby coping with change in temperature of phosphor layer 185.

FIG. 14 shows that relative output intensity of excited phosphor layer 185 depends on temperatures; as the temperature increases, the relative output intensity decreases. That is, when phosphor layer 185 is excited by laser light source 182 at a constant output level, a light-emission amount of phosphor layer 185 decreases with increase in temperature within the range of permissive temperatures from $\theta_1$ to $\theta_3$.

The device addresses the problem above. Receiving detection data from temperature sensor 184, luminance control circuit 180 compares the detected temperature of phosphor layer 185 or of the periphery (hereinafter, detected temperature) with reference temperature $\theta_2$. Determining whether the detected temperature is higher or lower than the reference temperature, luminance control circuit 180 switches between output control of the laser light sources and amplitude control of projection image signals. As shown in FIG. 4, when the detected temperature belongs to the range from $\theta_1$ to $\theta_2$, luminance control circuit 180 calculates a correction value by using a predetermined calculating formula for difference between the detected temperature and the reference temperature. The correction value is employed for output control of the laser light sources that excite phosphor layer 185. The output control allows phosphor layer 185 to have a corrected amount (i.e., an amount decreased to a standard level) of light emission, maintaining a standard luminance of projection image. When the detected temperature belongs to the range from $\theta_2$ to $\theta_3$, a correction value is calculated by using a predetermined calculating formula for difference between the detected temperature and the reference temperature. Signal gain control circuit 150 carries out amplitude control of a projection image signal so as to provide the signal with white-level expansion. This allows projection image to maintain a standard luminance.

Figure 5:
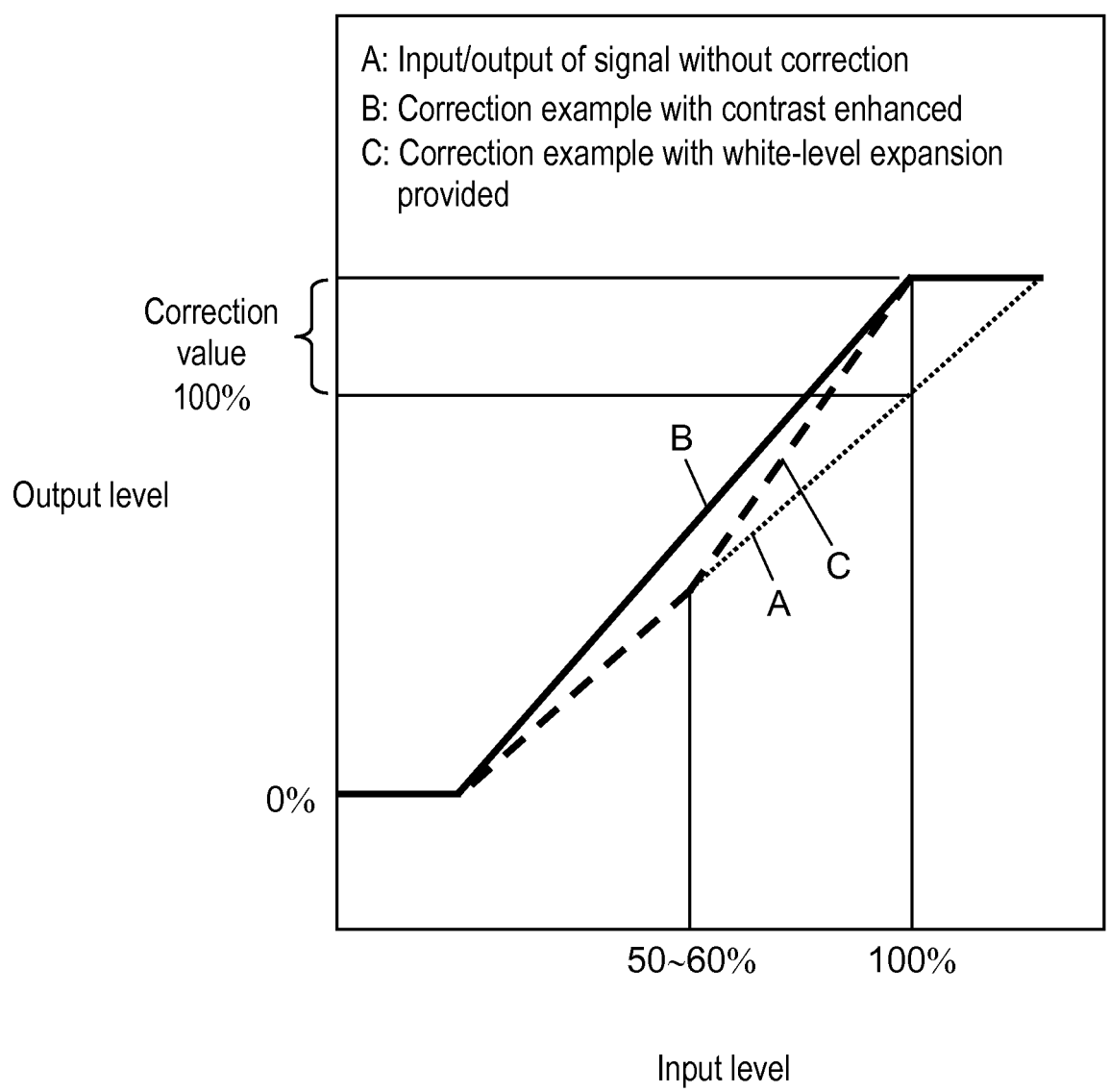
FIG. 5 shows a method of controlling the amplitude of a projection image signal of projection image in the projection image display device in accordance with the first exemplary embodiment of the present invention.

As described above, a temperature rise of phosphor layer 185 invites decrease in relative output intensity of phosphors, resulting in a dimmed screen. However, if the output of the light source is increased in expectation that phosphor layer 185 has an increased amount of light emission, phosphor layer 185 can be deteriorated by further increase in temperature. According to the device, the dimness of the screen is corrected by enhancing a white expansion level (i.e. a feel of brightness) with amplitude control of a projection image signal, without increase in output of the light source. FIG. 5 shows an example of correction on a white-expansion level by amplitude control of projection image. As a method of controlling amplitude of a projection image signal, FIG. 5 shows two examples: example B is obtained by increasing contrast uniformly, and example C is obtained by increasing the gain of a signal level higher than the intermediate input level.

As described above, when the detected temperature is not greater than the reference temperature, the device decreases the output of laser light source 182 that excites phosphor layer 185. When the detected temperature exceeds the reference temperature, the device controls amplitude of a projection image signal so as to provide the signal with white-level expansion. This allows projection image to maintain the luminance at which phosphor layer 185 has the reference temperature.

Figure 6:
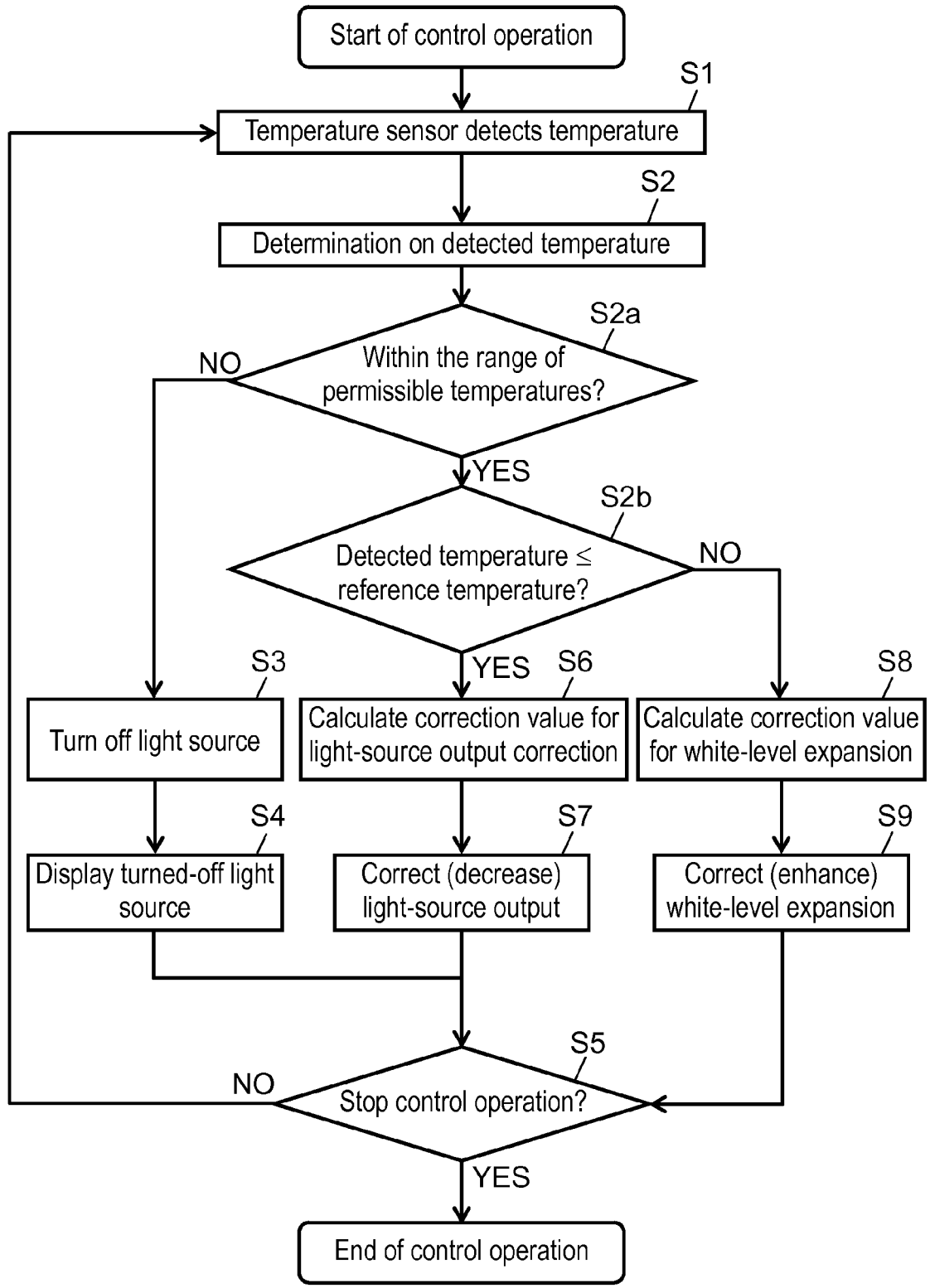
FIG. 6 is a flowchart showing the procedures of controlling the luminance of projection images of the projection image display device in accordance with the first exemplary embodiment of the present invention.

Next, the procedures of controlling luminance of projection image in luminance control section 210 will be described with reference to FIG. 6. FIG. 6 is a flowchart showing the procedures of luminance control of projection image in luminance control section 210.

At the start of the control procedures, in step S1, comparing section 211a of comparative processing section 211 receives a detected temperature from temperature sensor 184.

In step S2, comparing section 211a makes a comparison between the detected temperature and the reference temperature so as to determine a necessary procedure for luminance control. The determination has two stages. In step S2a as the first stage, comparing section 211a determines whether the detected temperature is in the range of permissible temperatures or not. If the detected temperature is out of the range (corresponding to NO in step S2a), luminance control section 210 requests light-source driving section 220 to turn off laser light sources 181, 182 and LED light source 183 (step S3). In response to the turn-off request, the display (not shown) of the device shows that the light sources are out of operation (step S4). After that, whether the control operation should be continued or not is determined in step S5. If comparative processing section 211 has not received a signal indicating termination of the control operation (i.e. in the case of NO in step S5), the procedure goes back to step S1; otherwise (i.e. in the case of YES in step S5), the control operation is completed.

In step S2a, if the detected temperature is in the range of permissible temperatures of the phosphors, the procedure goes to step S2b as the second stage of determination. If the detected temperature is not greater than the reference temperature (i.e. in the case of YES in step S2b), processing section 211b calculates a correction value for output control of laser light source 182 that excites phosphor layer 185 (step S6). After that, luminance control section 210 requests light-source driving section 220 to correct the output (i.e. to decrease the output) of laser light source 182 (step S7), and then the procedure goes to step S5.

In step S2b, if the detected temperature exceeds the reference temperature (i.e. in the case of NO), processing section 211b calculates a correction value for control of white level expansion of projection image (step S8), and then requests signal gain control circuit 150 via amplitude control section 213 to correct (increase) white level expansion (step S9). After that, the procedure goes to step S5.

Detecting change in temperature of phosphor layer 185 and substrate glass 15, the device effects output control of laser light source 182 and expansion control of a white level of a projection image signal. This effectively suppresses poorly-lit screen caused by temperature rise of phosphor layer 185. At the same time, the control suppresses an excessive amount of light emission of phosphor layer 185 with decrease in temperature, protecting phosphor layer 185 from deterioration.

Second Exemplary Embodiment

Figure 7:
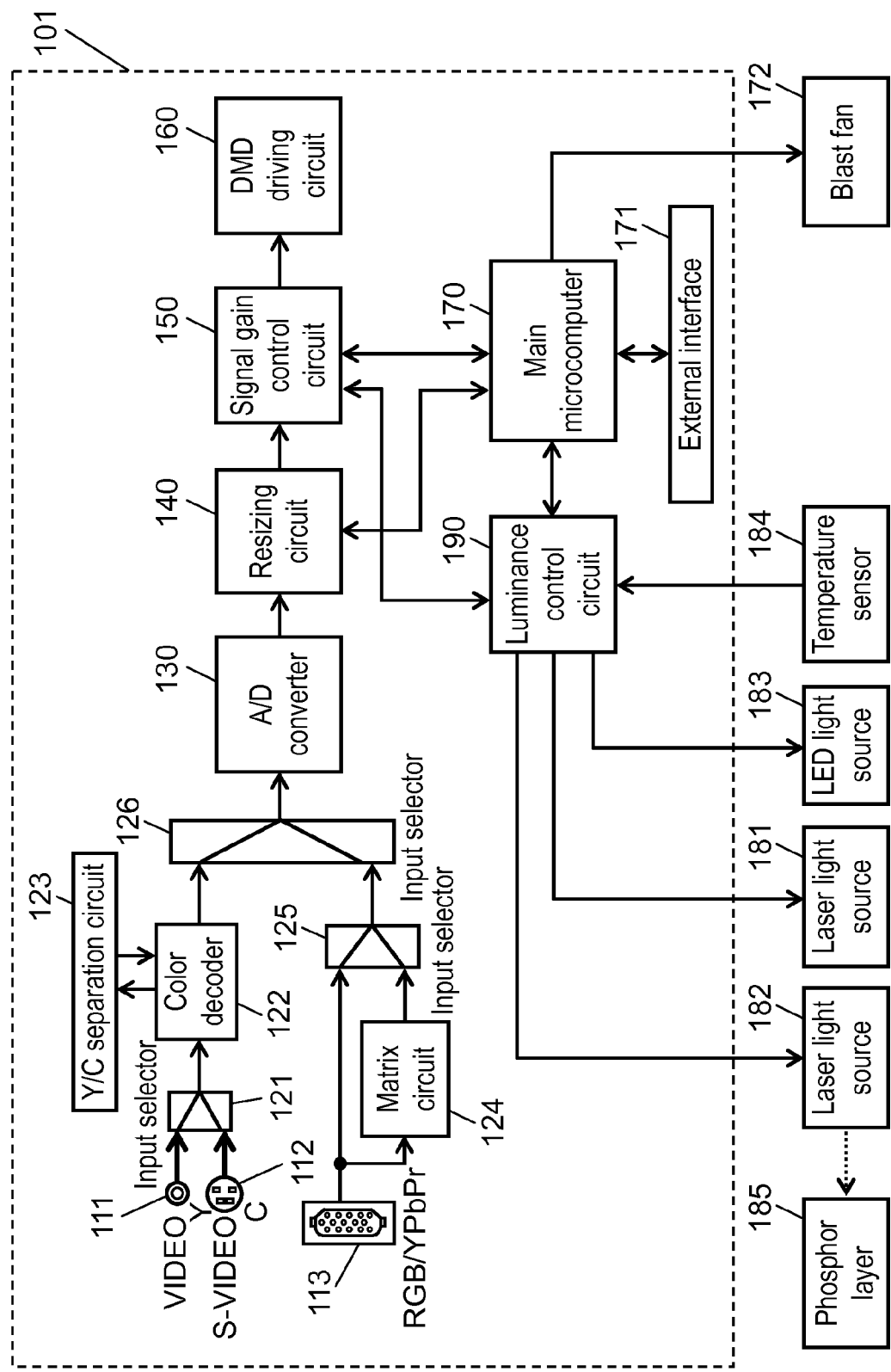
FIG. 7 is a block diagram showing the circuit structure of the projection image display device in accordance with a second exemplary embodiment of the present invention.
Figure 8:
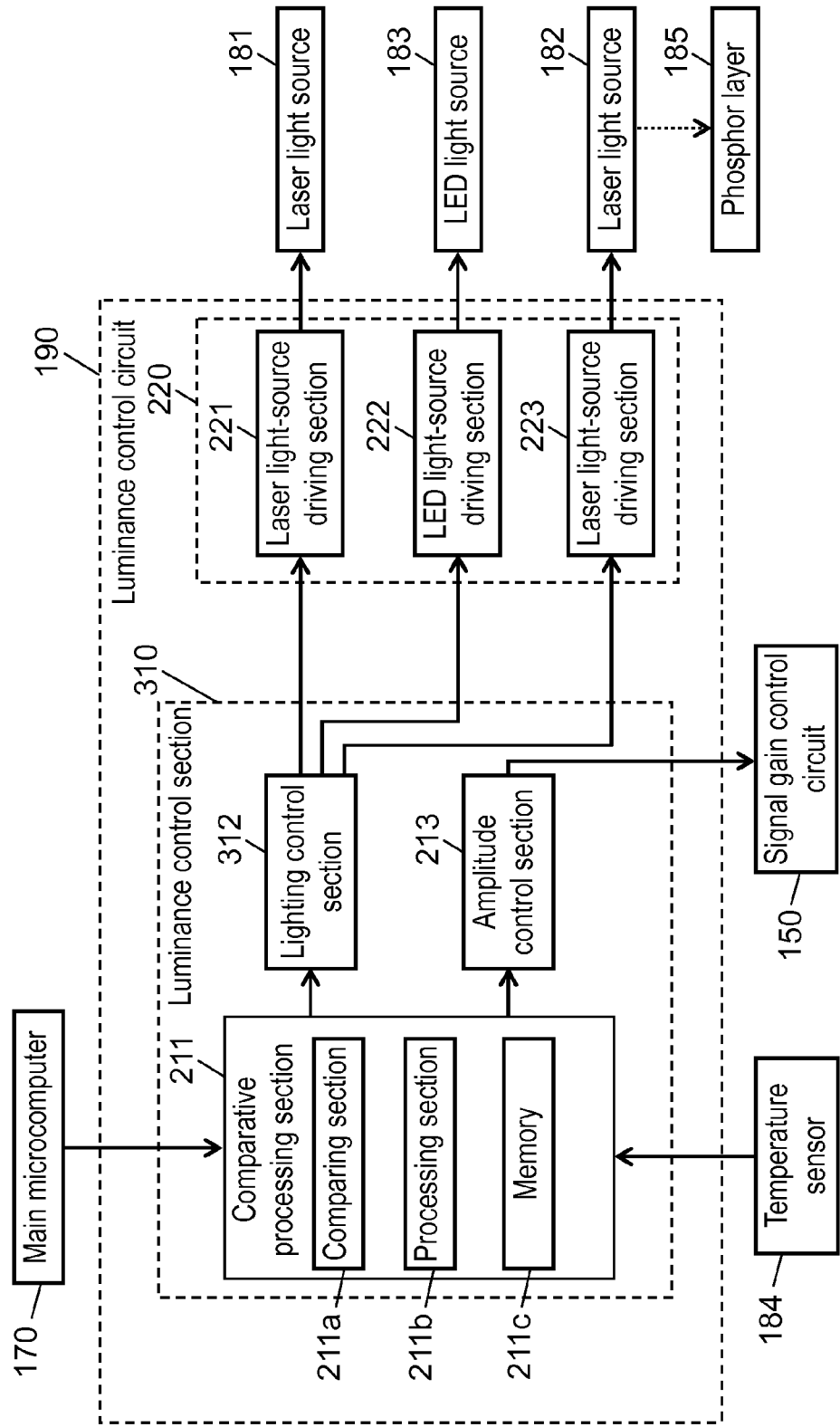
FIG. 8 is a block diagram showing the luminance control circuit of the projection image display device in accordance with the second exemplary embodiment of the present invention.

The projection image display device (hereinafter referred to as the device) of the second exemplary embodiment will be described. The device has optical device 1 having a structure the same as that shown in FIG. 1 of the first exemplary embodiment. FIG. 7 is a block diagram showing the main components of circuit section 101 of the device. Circuit section 101 of the device has luminance control circuit 190 that corresponds to luminance control circuit 180 of circuit section 100 described in the first exemplary embodiment. FIG. 8 is a block diagram showing the circuit structure of luminance control circuit 190. Luminance control circuit 190 has luminance control section 310 and light-source driving section 220. Luminance control section 310 has lighting control section 312, instead of light-source output control section 212 of luminance control section 210 of luminance control circuit 180. The rest of the structures shown in FIG. 7 and FIG. 8 are the same as those of FIG. 2 and FIG. 3, and similar reference marks are utilized in designating corresponding components of the device and the descriptions thereof will be omitted.

Receiving detection data from temperature sensor 184, luminance control circuit 190 carries out an excitation process of phosphor layer 185 based on predetermined lighting patterns of excitation light source 182. Luminance control circuit 190 changes the lighting patterns to control the number of light sources to be turned on/off, determining an optimum luminance of the excitation light source. As a result, the device allows phosphor layer 185 to maintain a predetermined value representing an optimum amount of light emission. The predetermined value is defined so that screen display with optimum level of luminance can be obtained.

Figure 9:
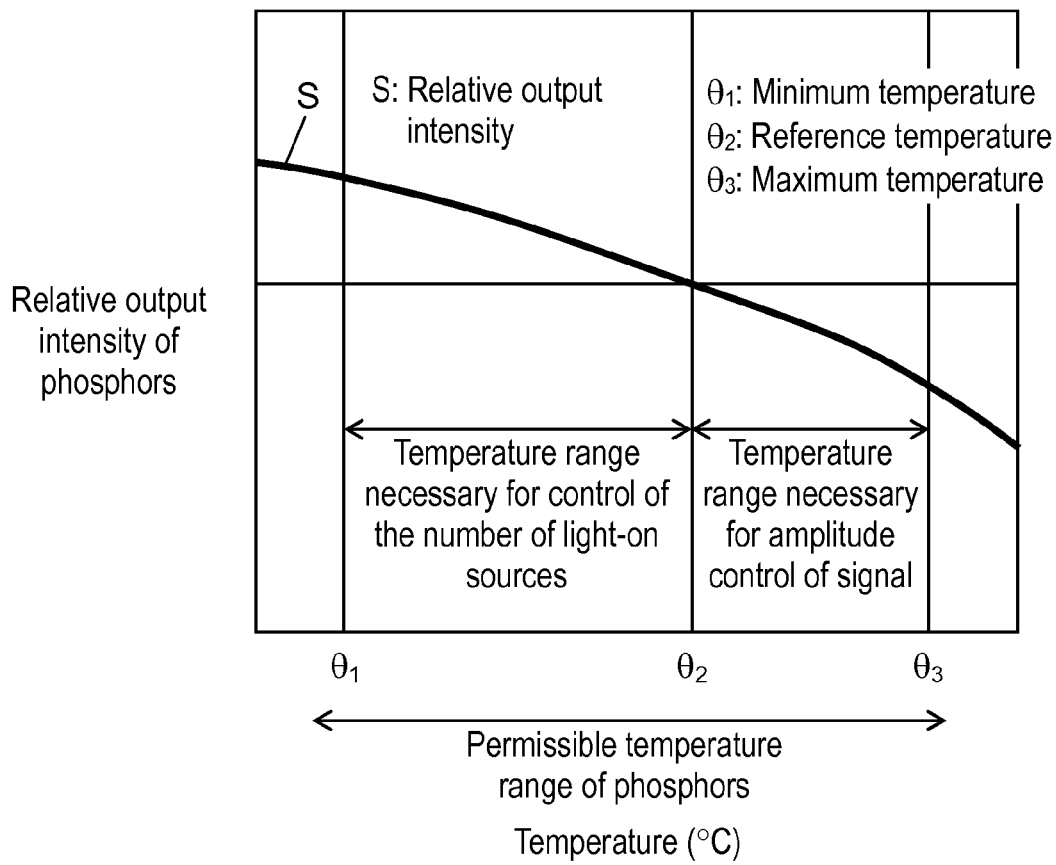
FIG. 9 illustrates how to control the light emission of the phosphors of the projection image display device in accordance with the second exemplary embodiment of the present invention.

FIG. 9 illustrates how to control the light emission of the phosphors of the device. Receiving detection data from temperature sensor 184, luminance control circuit 190 makes a comparison between the detected temperature of phosphor layer 185 or of the periphery and reference temperature $\theta_2$. Determining whether the detected temperature is higher or lower than the reference temperature, luminance control circuit 190 switches between output control of the laser light sources and amplitude control of projection image signals. As shown in FIG. 9, when the detected temperature is in the range from $\theta_1$ to $\theta_2$, luminance control circuit 190 calculates a correction value by using a predetermined calculating formula for difference between the detected temperature and the reference temperature. The correction value is employed for the control of the number of light-on sources of laser light source 182 that excites phosphor layer 185 (corresponding to phosphor layer 16 of FIG. 1). Luminance control circuit 190 decreases the amount of excitation light in a manner that the number of light-on light sources decreases with decrease in temperature. When the detected temperature is out of the range from $\theta_2$ to $\theta_3$, luminance control circuit 190 controls amplitude of projection image signals, as is in the case of the first exemplary embodiment.

The procedures of controlling luminance of projection image in luminance control section 310 are the same as those shown in the flowchart of FIG. 6 except for the controlling method of luminance of the excitation light source.

Figure 10:
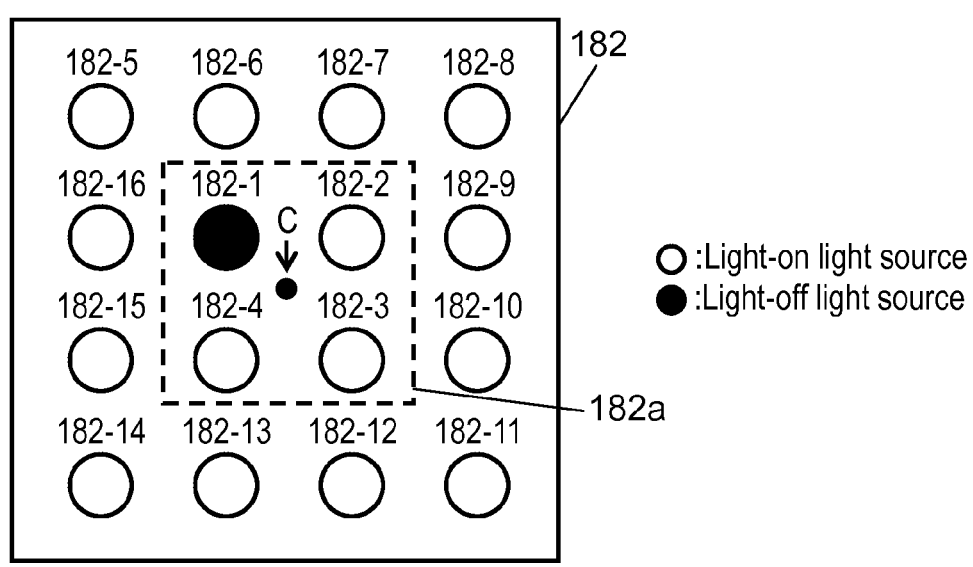
FIG. 10 illustrates the structure of excitation light sources of the projection image display device in accordance with the second exemplary embodiment of the present invention.

Next, lighting patterns of excitation light source 182 and a method of switching the lighting patterns will be described with reference to examples shown in FIG. 11 through FIG. 13. FIG. 10 illustrates the structure of excitation light source 182.

Figure 11:
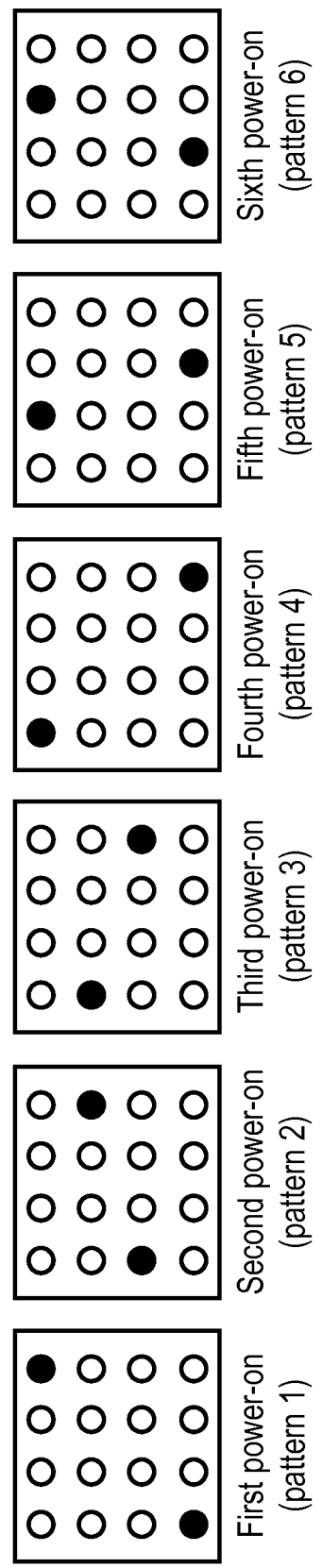
FIG. 11 shows lighting patterns of the excitation light sources of the projection image display device in accordance with the second exemplary embodiment of the present invention.

FIGS. 11 through 13 show lighting patterns of the excitation light sources and examples of switching the lighting patterns.

First, the structure of excitation light source 182 is described with reference to FIG. 10. Excitation light source 182 has a plurality of light sources. FIG. 10 shows an example having 16 light sources of 182-1 to 182-16 in a square arrangement. In the example, only light source 182-1 is turned off (as the light-off source) and the rest of the light sources are turned on (as the light-on source). In the device, the light sources of excitation light source 182 are grouped into two: central group 182a and the peripheral group located around central group 182a. In the example of FIG. 10, the central group has four light sources (182-1 to 182-4) and the peripheral group has 12 light sources (182-5 to 182-16). Hereinafter, the lighting patterns and examples of switching the lighting patterns will be described.

FIG. 11 shows lighting patterns where the peripheral group has a light-off source. The example has six lighting patterns. Each time the power is turned on, the lighting patterns are cyclically changed from pattern 1 through pattern 6. The lighting patterns of FIG. 11 have the following structural features:

throughout the six patterns, light-off sources are disposed only in the peripheral group; and the light-off sources (and the light-on sources) are disposed in such a way as to be nearly symmetric with respect to center C of the square arrangement.

With the structure above, the light from the light sources of the central group is effectively used. At the same time, the light sources in the peripheral group sequentially have a rest period at power-on of light source 182. The structure allows a light source of the peripheral group to be used for a burnt-out light source, providing emission output with stability. In an optical system, a central part close to the optical axis has less distortion of lens 31 and enhanced coating property of the lens. Considering above, the structure having light-on sources disposed in the central group enhances usage efficiency of light. Further, the lighting patterns disposed nearly symmetric with respect to center C enhances uniformity of luminance of the screen.

Figure 12A:
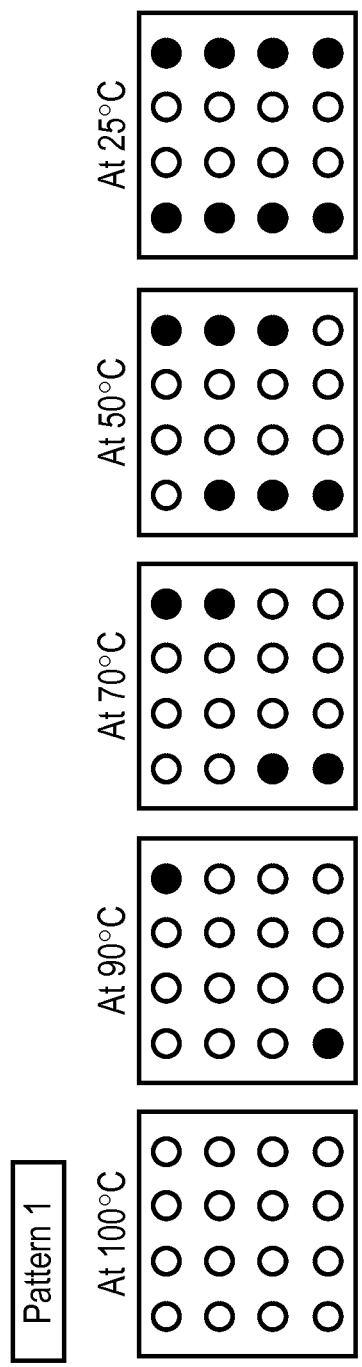
FIG. 12A shows lighting patterns of the excitation light sources of the projection image display device in accordance with the second exemplary embodiment of the present invention.
Figure 12B:
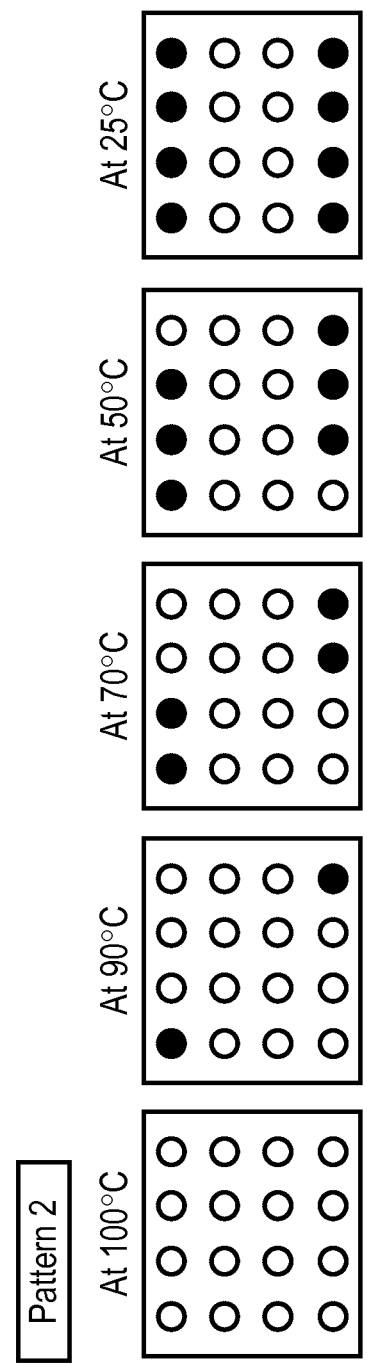
FIG. 12B shows lighting patterns of the excitation light sources of the projection image display device in accordance with the second exemplary embodiment of the present invention.

FIGS. 12A and 12B show that the number of light-on sources of excitation light source 182 is switched between the example patterns according to the temperature detected by temperature sensor 184. The example has two patterns of light-on sources for each temperature. The pattern of the example is determined in a manner that the number of light-off sources increases with decrease in detected temperature. That is, in the excitation process of phosphor layer 185, laser light source 182 has decrease in luminance with decrease in temperature of phosphor layer 185. By virtue of the luminance control, the temperature-dependent output intensity of phosphor layer 185 (shown in FIG. 14) can be corrected. The structure suppresses an excessive amount of light emission of phosphor layer 185 at a low temperature to protect it from deterioration, maintaining luminance of projection image at a proper level.

The lighting pattern of FIG. 12A (pattern 1) differs from that of FIG. 12B (pattern 2) in location of light-off sources. Switching between pattern 1 and pattern 2 allows the light sources to have a uniform light-on period, suppressing the light sources from deterioration. Switching between pattern 1 and pattern 2 is timed, for example, to the power-on of the device. In each of pattern 1 and pattern 2, like the structure of FIG. 11, light-off sources are disposed in the periphery, and the lighting pattern is formed to be nearly symmetric with respect to the center of the arrangement.

The relationship between a detected temperature and the number of light-on sources are cited merely by way of example and without limitation.

FIGS. 13A through 13C show three types of lighting rotation timed with a frame of the screen. Specifically, FIG. 13A shows an example having two lighting patterns (pattern 1 and pattern 2) switched by the every frame (1/60 sec). FIG. 13B shows an example having four lighting patterns (patterns 1 through 4) switched by the every frame. Further, FIG. 13C shows an example having eight lighting patterns (patterns 1 through 8) switched by the every frame.

The structure above allows the screen to have a desired luminance level in a manner that a signal level is synchronized with luminance of a light source. At the same time, phosphor layer 185 uniformly receives light from the light source. Besides, the grouped lighting patterns easily cope with increase in the number of lighting patterns, by which a desired rotation can be easily attained.

As described above, the device detects change in temperature of phosphor layer 185 and substrate glass 15 and determines the number of light-on sources of laser light source 182 and a white expansion level of a projection image signal. This effectively suppresses dimness of the screen due to increase in temperature of phosphor layer 185. At the same time, this suppresses an excessive amount of light emission of phosphor layer 185 at a low temperature, protecting phosphor layer 185 from deterioration.

In the exemplary embodiments, the structure employs a light-emitting diode for emitting red light, a laser light source for emitting blue light, and green phosphors that emits green light through excitation by blue laser. It will be understood that light sources of the three colors can be obtained by combination of a light-emitting diode, organic electroluminescence, and a laser diode.

Although the structure of the embodiments employs blue laser as a light source and a phosphor layer that emits green, it is not limited to. The method of the present invention can be applied to a structure where a red-emitting phosphor layer is disposed on a different optical path so as to obtain white color through a synthesis process.

When laser light is used as a light source, for example, the structure has to cope with issues on speckle removal and on compliance with safety standard. An application of the present invention improves the problem on speckles. That is, employing a structure having near-ultraviolet laser as a light source and phosphor layers emitting visible light of blue, green, and red excited by the near-ultraviolet laser allows the illuminating light to be limited to excitation light from the phosphors, thereby eliminating an adverse effect caused by speckles. The aforementioned structure has to cope with change in temperature of the phosphor layers for emitting three colors, and therefore the present invention advantageously works on the necessity.

Instead of the DMD used as an image display element in the embodiments, liquid crystal display elements can be used.

According to the temperature detection described in the embodiments, the structure of FIG. 1 directly detects temperature of the phosphor layer formed on substrate glass 15 as a fixed structure. When substrate glass 15 is formed as a movable structure, the temperature of the phosphor layer may be indirectly detected, for example, through ambient temperature, phosphor intensity (i.e. the emission amount of the phosphor layer), excitation intensity (i.e. luminescence of the excitation light source).

Although the structure of FIG. 2 has signal gain control circuit 150 located on the downstream of resizing circuit 140, it is not limited to. Signal gain control circuit 150 may be located on the upstream of resizing circuit 140.

In the structure of the embodiments, when the phosphor layer has a high temperature (in a range of $\theta_2$-$\theta_3$), the device effects amplitude control of a projection image signal so as to maintain proper luminance. Combining the amplitude control of a projection image signal and the lighting control of the excitation light source is also effective in maintaining proper luminance of projection image.

What is claimed is:

1. A projection image display device comprising:
   a plurality of light sources;
   a phosphor layer that emits light through excitation by at least any one of the plurality of light sources;
   an optical section that determines an optical path of light emitted from the light sources and the phosphor layer;
   a temperature detector that directly or indirectly detects a temperature of the phosphor layer or of a peripheral section of the phosphor layer;
   a light-source intensity controller that controls intensity of the light sources exciting the phosphor layer;
   an amplitude controller that controls amplitude of a projection image signal; and
   a luminance controller that controls luminance of projection images displayed by the projection image display device by switching to the light-source intensity controller when the detected temperature is less than a predetermined reference temperature and further switching to the amplitude controller when the detected temperature is greater than the predetermined reference temperature.

2. The projection image display device of claim 1, wherein the luminance controller compares the detected temperature with a predetermined reference temperature, and when the detected temperature is not greater than the reference temperature, the luminance controller prompts the light-source intensity controller to decrease intensity of the light sources, whereas when the detected temperature exceeds the reference temperature, the luminance controller prompts the amplitude controller to expand a white level of the projection image signal.

3. The projection image display device of claim 1, wherein the temperature detector detects a temperature of the phosphor layer indirectly through ambient temperature of the phosphor layer, phosphor intensity, and excitation intensity.

4. The projection image display device of claim 1, wherein the light sources are at least any one of a laser light source and a light-emitting diode, and the phosphor layer is excited by the laser light source.

5. The projection image display device of claim 2, wherein the light-source intensity controller control output of the light sources so as to decrease intensity of the light sources.

6. The projection image display device of claim 2, wherein the light-source intensity controller has a lighting controller that controls, according to the detected temperature, a number of light-on light sources in the light sources disposed in an arrangement.

7. The projection image display device of claim 2, wherein the amplitude controller enhances contrast of the projection image signal.

8. The projection image display device of claim 2, wherein the amplitude controller increases a gain of a signal level higher than an intermediate input level of the projection image signal.

9. The projection image display device of claim 6, wherein the lighting controller controls the number of light-on light sources by changing lighting a pattern formed of a pattern with a part of the light sources to be turned on or a pattern with all the light sources to be turned on, and the light-on light sources of the lighting patterns are disposed nearly symmetric with respect to a center of the arrangement of the light sources.

10. The projection image display device of claim 9, wherein the lighting controller changes the lighting patterns in rotation.

11. The projection image display device of claim 9, wherein the lighting controller changes the lighting patterns by every frame of display screen so that each of the lighting pattern is synchronized with the frame.

12. The projection image display device of claim 9, wherein the lighting controller turns on a light source disposed in a central part of the arrangement and turns off a light source disposed in a peripheral part of the arrangement.

13. The projection image display device of claim 10, wherein the lighting patterns are formed into a plurality of rotation groups, and changing the rotation groups from one to another allows the lighting patterns to be changed in rotation.

14. The projection image display device of claim 10, wherein the lighting controller changes the lighting patterns by every frame of display screen so that each of the lighting pattern is synchronized with the frame.

15. The projection image display device of claim 10, wherein the lighting controller turns on a light source disposed in a central part of the arrangement and turns off a light source disposed in a peripheral part of the arrangement.

16. The projection image display device of claim 13, wherein the lighting controller changes the lighting patterns by every frame of display screen so that each of the lighting pattern is synchronized with the frame.

17. The projection image display device of claim 13, wherein the lighting controller turns on a light source disposed in a central part of the arrangement and turns off a light source disposed in a peripheral part of the arrangement.

18. The projection image display device of claim 4, wherein the light sources have a blue laser source and a red light-emitting diode, and the phosphor layer emits green visible light through excitation by the blue laser source.

19. The projection image display device of claim 4, wherein the light sources are blue laser sources and the phosphor layer has a phosphor layer emitting green visible light and a phosphor layer emitting red visible light through excitation by the blue laser sources.

20. The projection image display device of claim 4, wherein the light sources are near-ultraviolet laser sources and the phosphor layer has a phosphor layer emitting blue visible light, a phosphor layer emitting green visible light, and a phosphor layer emitting red visible light through excitation by the near-ultraviolet laser sources.

* * * * *